United States Patent [19]

Stahl

[11] 4,230,207

[45] Oct. 28, 1980

[54] DISC BRAKE PAD

[76] Inventor: Kurt Stahl, Wahner Str. 19-21, 5000 Köln 21, Fed. Rep. of Germany

[21] Appl. No.: 929,985

[22] Filed: Aug. 1, 1978

[30] Foreign Application Priority Data

Aug. 1, 1977 [DE] Fed. Rep. of Germany ....... 2734585

[51] Int. Cl.³ ............................................. F16D 69/00
[52] U.S. Cl. ................................. 188/73.1; 188/250 B
[58] Field of Search .................. 188/73.1, 73.5, 250 B, 188/250 E, 200 G, 71.1, 264 G, 251 A, 256, 261

[56] References Cited

U.S. PATENT DOCUMENTS

| 3,162,271 | 12/1964 | Hanson | 188/264 G |
| 3,400,789 | 9/1968 | Mione | 188/250 B |
| 3,552,526 | 1/1971 | Beuchle et al. | 188/250 B |
| 3,848,708 | 11/1974 | Noguchi | 188/250 B |

FOREIGN PATENT DOCUMENTS

| 2002040 | 7/1971 | Fed. Rep. of Germany | 188/250 B |
| 2109907 | 9/1971 | Fed. Rep. of Germany | 188/251 A |
| 2407321 | 8/1975 | Fed. Rep. of Germany | 188/250 B |
| 2644718 | 4/1978 | Fed. Rep. of Germany | 188/73.1 |
| 1025881 | 4/1966 | United Kingdom | 188/250 B |

Primary Examiner—Edward R. Kazenske
Attorney, Agent, or Firm—Spencer & Kaye

[57] ABSTRACT

A disc brake pad assembly includes a hard porcelain carrier body and a friction element affixed to the carrier body and having a work face for cooperation with a brake disc. The friction element is provided with a plurality of blind recesses which are open solely towards the work face. The assembly further includes a protective covering attached to the carrier body and extending over a rear face of the carrier body oriented away from the friction element. The protective covering extends over at least a portion of two oppositely located narrow sides which form part of the carrier body and which are spaced in a circumferential direction of the brake disc when the assembly is in operative relationship with the brake disc.

5 Claims, 1 Drawing Figure

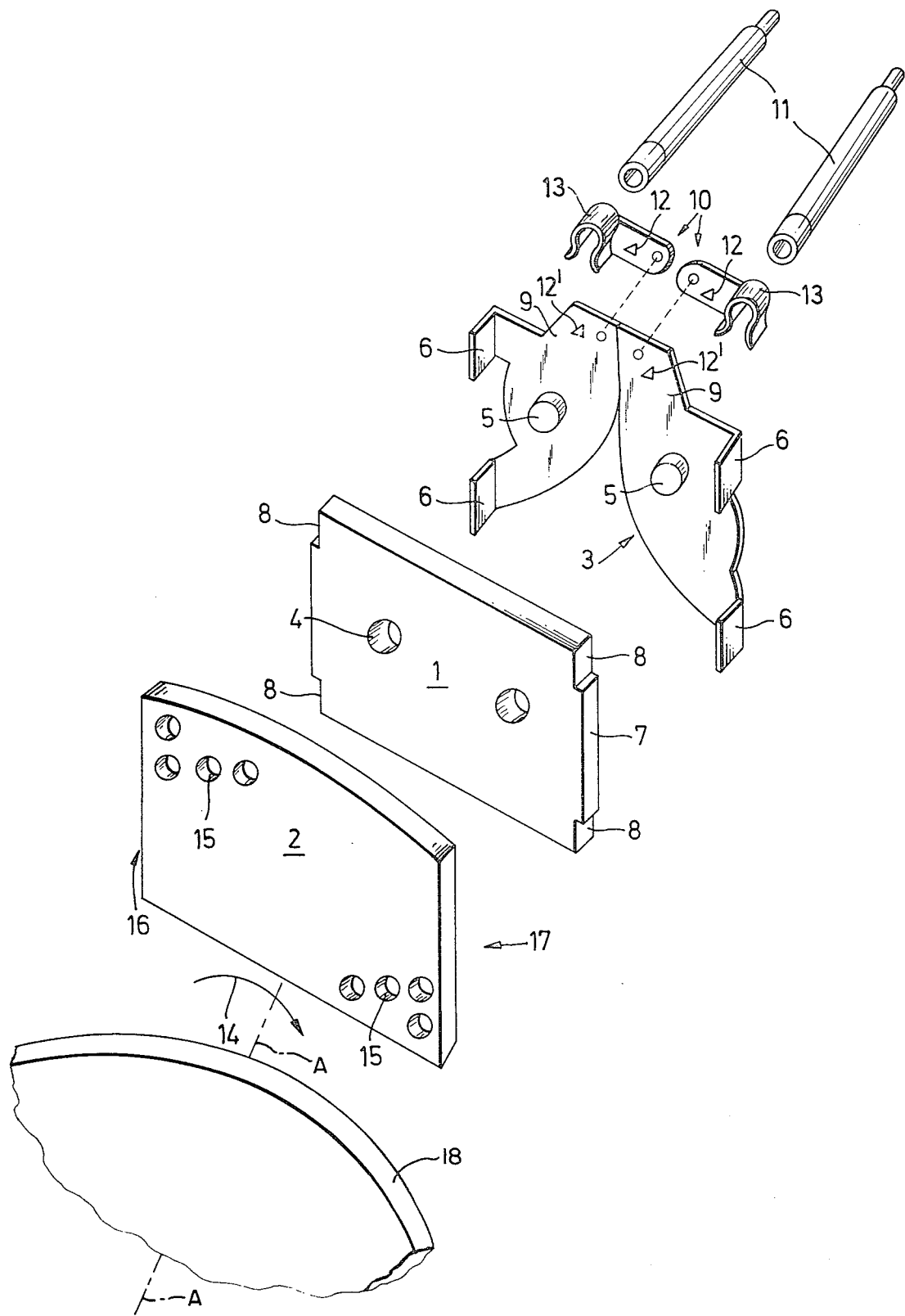

DISC BRAKE PAD

BACKGROUND OF THE INVENTION

The invention relates to a brake pad for a disc brake, particularly for a vehicle disc brake, including a carrier body on which a friction element is fastened.

In vehicle brakes, particularly motor vehicle brakes, so-called brake fading occurs for a short period of time during extended or frequent braking. Due to the brakes heating up, the frictional properties of the brake element temporarily change so that the braking effect is reduced considerably. This reduction is practically impossible to compensate even with increased pedal pressure. If it is attempted to arrive at frictional properties which are sufficient even for high temperatures by appropriate composition of the friction element, which is achieved with so-called "hard" friction elements, it is necessary to accept the fact that, because of the hardness of the friction element, the brake discs, while in the cold state, are subject to considerable wear due to the hardness of the friction element. Such a wear is reduced only with increasing heating during operation. Such brake elements are therefore preferred in high performance brakes, for example brakes for racing and sports cars. If, however, so-called "soft" brake elements are used, the wear behavior during normal operation is more favorable with respect to the brake discs. But the friction elements then have a reduced service life so that such brake pads must be replaced more frequently.

SUMMARY OF THE INVENTION

It is an object of the invention to provide a brake pad which permits, among others, the use of hard brake elements for normal operation without encountering the drawbacks connected therewith.

This is accomplished by the invention in that the carrier body is made of a material having a lower heat conductivity than steel. This measure assures that already shortly after initiation of the braking process the friction element is heated to the required operating temperature even under the effect of a slight braking force and thus meets the requirements for normal operation. On the other hand, the heat dissipation through the carrier body during intensive heating as a result of long braking periods, without producing the corresponding brake fading, is sufficient as the favorable brake fade characteristics of a hard brake element can be fully utilized.

In principle, any material with the appropriate characteristics with respect to heat conductivity and strength can be used as carrier body. For example, in addition to metals having poor heat conducting properties, appropriate plastics or the like can also be used. Since, however, such brake pads are wear parts which must be manufactured economically and in large quantitites, a particularly advantageous feature of the invention provides that the carrier body is made of a hard porcelain. Preferred is a hard porcelain corresponding to German Industrial Standard DIN 40 68 5 110.2. Such carrier bodies can be produced economically and in large quantities; they have the required properties regarding heat conductivity and hardness so that brake pads equipped in this manner produce good operating results.

Upon testing the influences of temperature on the braking effect it has been surprisingly found that the efficiency of a disc brake is also influenced to a considerable degree by the inevitably different temperature distribution in a radial direction on the brake disc and the associated brake pad. It has surprisingly been found that according to an embodiment of the invention the brake performance is improved considerably by providing the work face of the friction element which contacts the brake disc, with recesses which are open only toward the brake disc and are disposed only in the region of the leading and trailing sides and that in the installed state and with respect to the major direction of rotation of the brake disc the recesses on the leading side are arranged at a greater distance from the axis of rotation than the recesses on the trailing side. Such recesses in the friction element, which may be, for example, cylindrical recesses, have the result that, for example in automobile brakes, the same braking force compared to a brake having the prior art brake pads can be realized with much less brake pedal pressure. Moreover, the tendency toward brake fading is reduced considerably which probably is a result of the more uniform temperature distribution effected by the given asymmetrical arrangement of the recesses in the friction element. In this case too, test results indicate that the influence of heat dissipation through the carrier body appears to play a significant part.

According to a further feature of the invention the carrier body is connected, on its rear side facing away from the friction element, with a protective covering. Such a protective covering is of significance particularly with the use of carrier bodies of a hard and tough material such as, for example, plastic or porcelain, since it reduces local pressure peaks in the area of contact with the brake cylinders. According to a further feature of the invention, the protective covering may be made of sheet metal, in which case, however, the rear side of the carrier body is covered only in part in order to prevent excessive heat discharge.

According to still another feature of the invention the protective covering at least in part covers the narrow sides of the carrier body which extend in the circumferential direction of the brake disc. With this partial covering of the narrow sides, the edges of the carrier body are protected in an excellent manner in those regions where the braking force which acts in the circumferential direction of the brake disc has to be absorbed by the disc brake caliper. By virtue of this arrangement, edge compressions and pressure peaks which lead to local deformations in carrier bodies of plastic, or break-outs in carrier bodies of hard porcelain, are avoided.

The friction element on the one hand and the protective covering on the other hand are connected with the carrier body in the usual manner by glueing. It is, however, of particular advantage for the carrier body to have at least one recess in which a protrusion of the protective covering is held so that, in addition to the adhesive bond, the connection between the carrier body and the protective covering is effected in a form-fitting manner.

A further feature of the invention provides that the protective covering is equipped with a tongue which laterally protrudes beyond the carrier body and with which at least one securing means is connected so as to secure the brake pad to the retaining pins of the caliper.

BRIEF DESCRIPTION OF THE DRAWING

The sole FIGURE is a perspective exploded view of a preferred embodiment of the invention.

DESCRIPTION OF THE PREFERRED EMBODIMENT

Turning now to the FIGURE, the brake pad illustrated therein comprises a friction element 2 of conventional composition which is attached by means of an adhesive to one side of a carrier body 1 of a material having a lower heat conductivity than steel, for example hard porcelain. On its other side, the carrier body 1 is covered with a protective covering 3, for example of sheet steel, which is also connected to the carrier body 1 by means of an adhesive.

The carrier body 1 is provided with recesses 4 in the form of throughgoing bores into which extend protrusions 5 of the protective covering 3.

The protective covering 3 is provided with bent edge portions 6 which cover part of the narrow sides 7 spaced in the circumferential direction of a brake disc 18 with which the brake pad is to be associated. The brake disc 18 has an axis of rotation A. The arrow 14 indicates the major direction of rotation of the brake disc. Expediently, corresponding stepped sections 8 are provided on the side faces 7 at the points of contact with the bent edge portions 6. The sections 8 have a depth less than the thickness of the bent edge portions 6. In the illustrated embodiment, the protective covering 3 is made of sheet steel having a thickness of about 0.5 to 1 mm. The protective covering 3 as well as its bent edge portions 6 provide protection against concentrated stresses on the carrier body which is preferably hard porcelain. These stresses are applied by the brake cylinders or the contact faces of the brake caliper, respectively, on which the carrier body 1 is supported by means of the bent edge portions 6. For reasons of manufacturing technology, the protective covering 3 may be made in two pieces, as shown in the embodiment; it is feasible, however, to make it as a one-piece part. If the protective covering is made of a material which likewise has a lesser conductivity than steel, the protective covering may also cover the entire rear side of the carrier body.

On its one side, the protective covering is provided with a tongue 9 which protrudes beyond the side of the carrier body 1. Securing means 10 are fastened to the tongue 9 for enabling the brake pad to be mounted on the retaining pins 11 of the caliper. In the illustrated embodiment, the securing means are clamping clips which are pivotally fastened to tongue 9 and are each provided with a detent 12 which in the closed state engages in a recess 12' in the tongue 9. The clamp 13 disposed at the end of each clamping clip 10 then surrounds the respective securing pin 11.

Recesses 15 shaped, for example, as cylindrical blind bores are provided in that face of the friction element 2 which is oriented towards the brake disc. Thus, the recesses 15 are open only on the side facing the brake disc. The bores extend only over a region of the friction surface in a particular distribution. Thus, part of the bores are disposed in the area of the leading side 16 and the other part in the area of the trailing side 17 of the friction element 2, as viewed in the rotary direction 14. For a brake pad with a coating thickness of about 9 to 13 mm, a width of 50 mm and a length of 90 mm, the diameter of the recesses 15 is, for example, about 8 mm. The thickness of the carrier body may be 4.5 to 6 mm, depending on its type, while the thickness of the protective covering is 0.5 to 1 mm. In experiments, the proposed arrangement of the recesses 15 has produced an almost uniform temperature distribution on the brake disc in a radial direction and consequently on the friction surface of the brake pad as well. Moreover, with a so-called "hard" brake element, excellent brake performance was obtained already in the cold state without brake fading, comparable to conventional brake pads occurring after long periods of braking. In addition to the particularly favorable heat distribution by means of the bores 15, the superior brake performance is also likely to be the result of the fact that, due to the poor heat conductivity of the carrier body, much less heat is transferred to the brake cylinder and thus to the brake fluid than in prior art arrangements. Even under extensive heating, brake fading as a result of the formation of vapor bubbles in the brake cylinder could not be noted.

It is to be understood that the above description of the present invention is susceptible to various modifications, changes and adaptations, and the same are intended to be comprehended within the meaning and range of equivalents of the appended claims.

I claim:

1. In a disc brake pad assembly including a carrier body and a friction element affixed to the carrier body and having a work face for cooperation with a brake disc which has a major direction of rotation and a rotary axis; said friction element having a leading side and a trailing side with respect to said major direction of rotation; said carrier body having two oppositely located narrow sides spaced from one another in a circumferential direction of the brake disc; the improvement wherein said carrier body is hard porcelain; the improvement further comprising means defining a plurality of blind recesses provided in said friction element and being open solely towards said work face; said recesses being grouped such as to occupy solely zones adjacent said leading and trailing sides of said friction element and the recesses arranged in the zone adjacent said leading side being situated at a greater distance from said rotary axis than the recesses arranged in the zone adjacent said trailing side; and a protective covering attached to said carrier body and extending over a rear face of said carrier body oriented away from said friction element; said protective covering further extending over at least one part of said narrow sides of said carrier body.

2. A disc brake pad assembly as defined in claim 1, wherein said protective covering is a sheet metal component; said protective covering extending only over one portion of said rear face of said carrier body.

3. A disc brake pad assembly as defined in claim 1, further comprising means defining at least one opening in said carrier body and a projection in said protective covering; said projection being held in said opening provided in said carrier body.

4. A disc brake pad assembly as defined in claim 1, further comprising retaining pin means adapted to be held in a caliper; and securing means mounted on said protective covering and attached to said retaining pin means for securing said brake pad to the caliper.

5. A disc brake pad assembly as defined in claim 4, wherein said securing means comprises a clip for clamping onto said retaining pin means.

* * * * *